(12) United States Patent
Fedders et al.

(10) Patent No.: US 6,603,776 B1
(45) Date of Patent: Aug. 5, 2003

(54) SYSTEM FOR EFFICIENT BROADBAND DATA PAYLOAD CONVERSION

(75) Inventors: Jeff G. Fedders, Westminster, CO (US); Winston K. Mok, Vancouver (CA); Stephen Richard Peck, Boulder, CO (US); Floyd Craig Wolverton, Westminster, CO (US)

(73) Assignee: Lucent Technologies, Inc. & PMC-Sierra, Inc.

( * ) Notice: Subject to any disclaimer, the term of this patent is extended or adjusted under 35 U.S.C. 154(b) by 0 days.

(21) Appl. No.: 09/286,211

(22) Filed: Apr. 5, 1999

(51) Int. Cl.7 .................................................. H04J 3/22
(52) U.S. Cl. ...................................... 370/476; 370/539
(58) Field of Search ................................. 370/464, 466, 370/907, 468, 476, 498, 503, 505, 539

(56) References Cited

U.S. PATENT DOCUMENTS

| | | | | |
|---|---|---|---|---|
| 5,428,612 A | * | 6/1995 | Scheffel et al. | 370/468 |
| 5,465,252 A | * | 11/1995 | Muller | 370/380 |
| 5,666,351 A | * | 9/1997 | Oksanen et al. | 370/474 |
| 5,712,845 A | * | 1/1998 | Peltomaki | 370/226 |
| 5,857,092 A | * | 1/1999 | Nakamura et al. | 370/466 |
| 5,917,818 A | * | 6/1999 | Ko et al. | 370/377 |
| 6,011,802 A | * | 1/2000 | Norman | 370/466 |
| 6,266,333 B1 | * | 7/2001 | Kartalopoulos | 370/395.32 |

* cited by examiner

Primary Examiner—Melvin Marcelo
Assistant Examiner—Derrick W Ferris
(74) Attorney, Agent, or Firm—Hall, Priddy, Myers & Vande Sande

(57) ABSTRACT

The system for broadband data payload conversion functions to efficiently convert broadband data between two sets of data formats. In particular, this software system converts between AUG/AU3/VC3 clear channel payloads and AU4/VC4/TU3/VC3 clear channel payloads in an efficient manner, which also complies with the industry standard data formatting requirements. The present system implements an efficient data format conversion process that uses existing circuitry and can effect the data format conversion with only a few bytes of delay instead of an entire frame of delay as is typically found in existing systems. This is accomplished by manipulating the format conversion to simplify the format conversion process.

6 Claims, 12 Drawing Sheets

SYSTEM FOR EFFICIENT BROADBAND DATA PAYLOAD CONVERSION

FIELD OF THE INVENTION

This invention relates to data transmission systems that are used to transmit broadband data and in particular, to a system for converting the format of clear channel payloads in a manner to minimize conversion delays yet comply with the industry standard formatting requirements.

PROBLEM

It is a problem in data transmission systems to efficiently convert data between different data formats. The need for data format conversion arises when the data transmission network is connected to terminal equipment which uses a data format that differs from the one used by the data transmission network. Typical data transmission systems frequently use custom integrated circuits to perform the data format conversion, but these circuits are expensive to develop and cannot be changed as the data formats change over time. An alternative to the use of custom integrated circuits is the use of software systems, but these systems trade speed of data format conversion provided by the custom integrated circuits for the flexibility to adapt to changes in the data format. Thus, it is a problem to implement data format conversion systems that are time wise efficient, inexpensive, and easy to modify to reflect changes in data formats.

In the case of AUG/AU3/VC3 clear channel payloads and AU4/VC4/TU3/VC3 clear channel payloads, a standard ITU conversion technique is used, which incurs a full frame of delay to effect the format conversion. Thus, each time the data stream must be converted to accommodate the needs of a particular circuit, this delay is added to the signal path, thereby reducing the effective data throughput of the overall system due to the signal processing delays and the need to process complex format conversion algorithms. The conversion of these clear channel payloads is presently effected by the use of custom integrated circuits which are expensive to develop and cannot be changed as the data formats change over time.

SOLUTION

The above described problems are solved and a technical advance achieved by the present system for broadband data payload conversion that functions to efficiently convert broadband data between two sets of data formats. In particular, this software system converts between AUG/AU3/VC3 clear channel payloads and AU4/VC4/TU3/VC3 clear channel payloads in an efficient manner, which also complies with the industry standard data formatting requirements. The present system implements an efficient data format conversion process that uses existing circuitry and can effect the data format conversion with only a few bytes of delay instead of an entire frame of delay as is typically found in existing systems. This is accomplished by manipulating the format conversion to simplify the format conversion process.

DETAILED DESCRIPTION

Definitions

For the purpose of this description, the following definitions are used to describe the preferred embodiment of the invention.

"Network Data" comprises data that is formatted in one of the industry standard data transmission formats, such as the AUG/AU3/VC3 clear channel payloads, which formats represent a plurality of multiplexed data streams.

"System Data" comprises data that is formatted in one of the industry standard data processing formats, such as the AU4/VC4/TU3/VC3 clear channel payloads, which formats represent a plurality of multiplexed data streams.

"AUG/AU3/VC3 clear channel payloads" comprise data payloads comprised of combinations of lower order data containers of any format compatible with either C-3 or TUG-2 definitions as given in applicable SDH/SONET standards. What is meant by "clear channel" is that the data passes through unchanged at these lower order data rates.

"AU4/VC4/TU3/VC3 clear channel payloads" comprise data payloads comprised of cominations of lower order data containers compatible with the C-3 definitions as given in applicable SDH/SONET standards. What is meant by "clear channel" is that the data passes through unchanged at these lower order data rates.

Architecture of the System for Broadband Data Payload Conversion

The present system resides on a circuit pack that comprises a port board that supports up to four STM-1 interfaces, each of which is capable of processing either one AU4 clear channel payload or three AU3 clear channel payloads. The interface either passes the AU4/VC4 payload without modification or provides a broadband gateway by converting received AUG/AU3/VC3 payloads into the AU4/VC4/TU3/VC3 payload that the system requires. The present system does not perform the standard conversion process from the received AUG/AU3/VC3 payloads into the AU4/VC4/TU3/VC3 payload, but instead performs a shortcut process. This port board interfaces to the Ml 6/1 system either by passing through the AU4/VC4 payload or by providing a broad-band gateway from an AUG/AU3/VC3 to an AU4/VC4/TU3/VC3 payload. In both options, the payload structure presented to the M16/1 system is in AU4/VC4 format. While lower-order TUs (TU12, TU11, TU2) can be transported through the SA-1/4 circuit pack and the MI6/1 system, these TUs are not extracted within the M16/1 system itself. There is nothing to hinder such extractions once the AU4/VC4/TU3/VC3 payload is converted back to a AUG/AU3/VC3 and applied to a network element that can handle these lower-order structures. In other words, passing through the SA-1/4 and M16/1 system and going through this conversion does not "damage" any lower order TUs if present.

Figure 1:
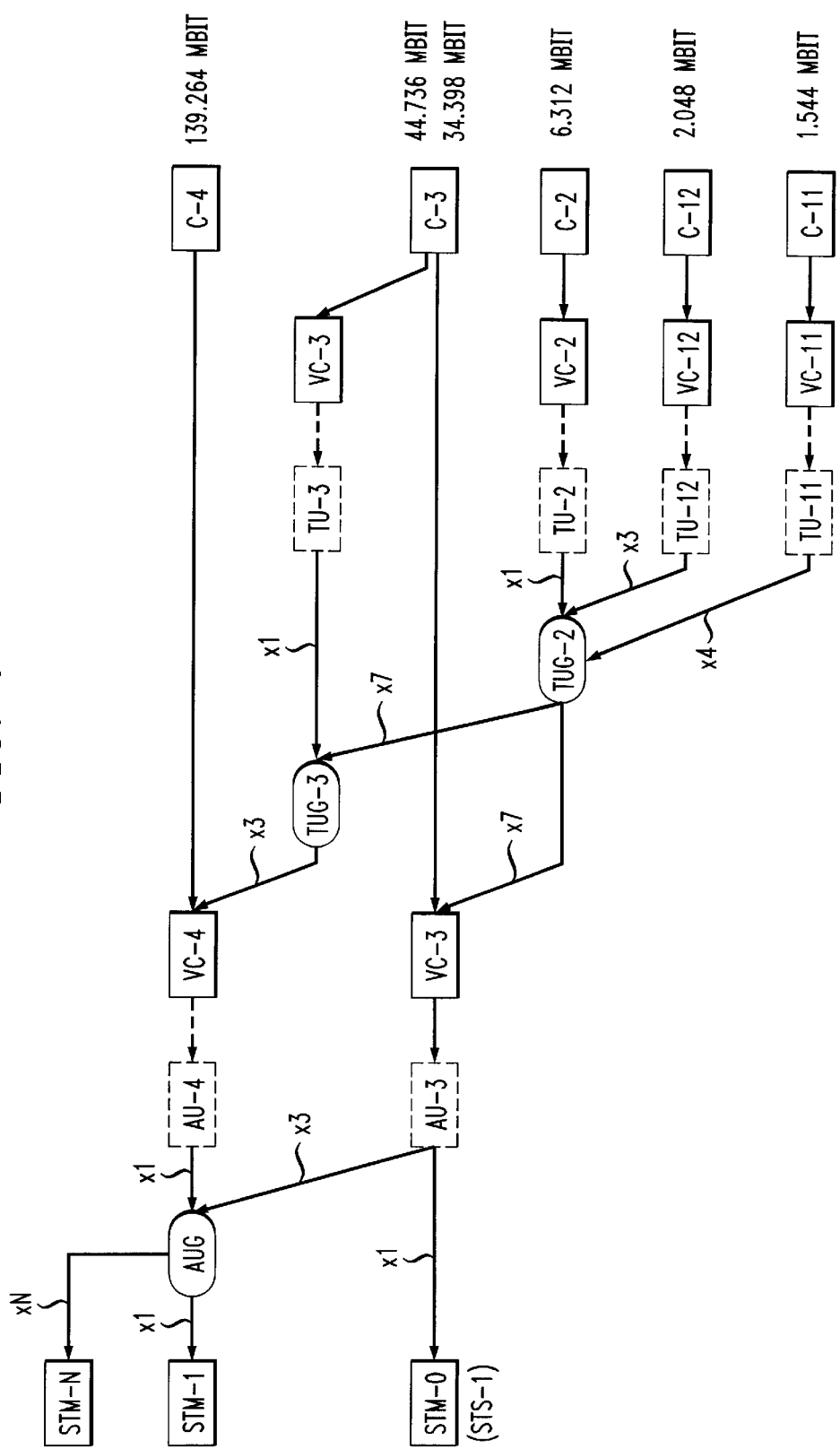
FIG. 1 illustrates in block diagram form the multiplexing structure in terms of the format conversion in the receive path from AUG/AU3/VC3 clear channel payloads to AU4/VC4/TU3/VC3 clear channel payloads.
Figure 2:
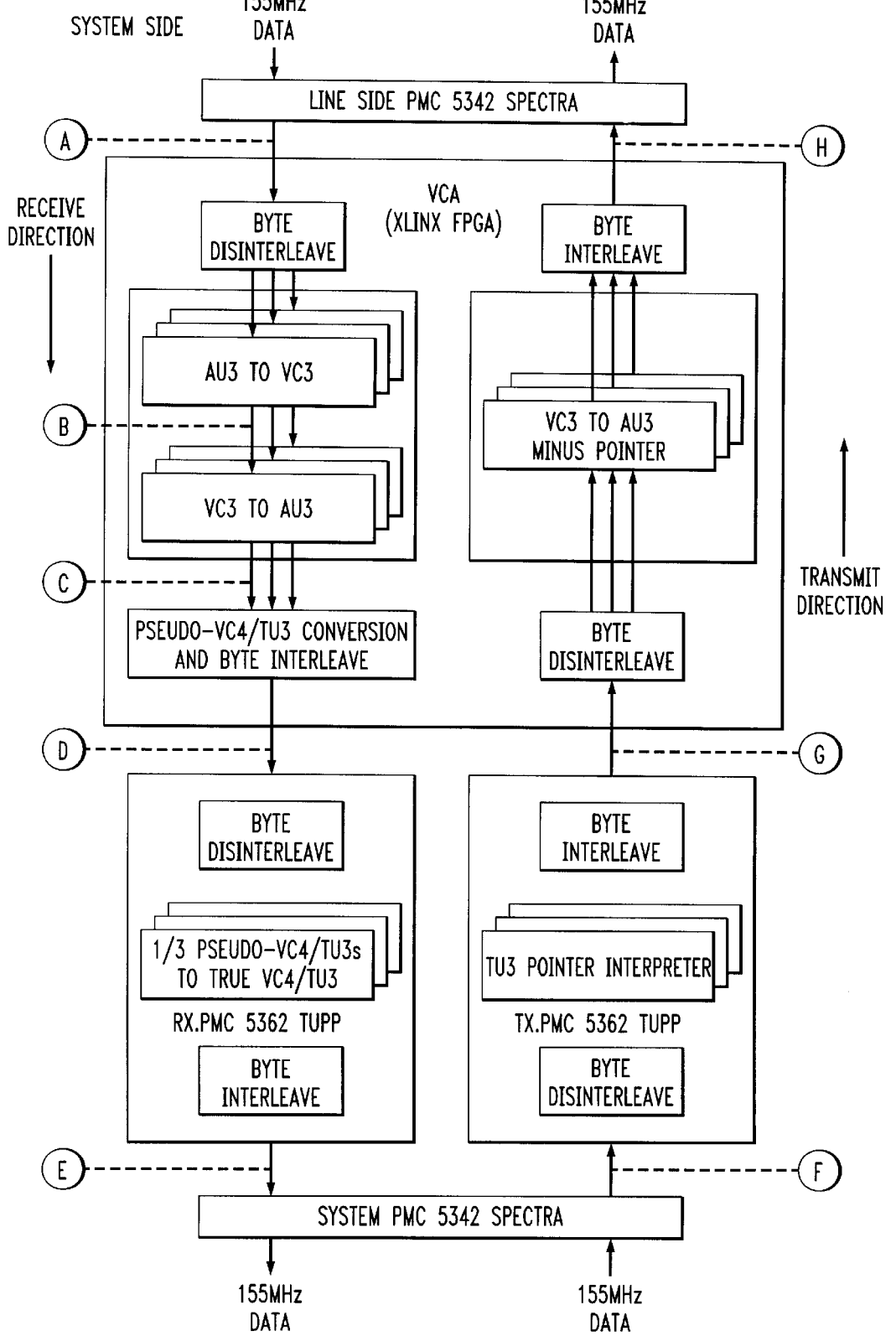
FIG. 2 illustrates in block diagram form the architecture of the present system for broadband data payload conversion.
Figure 8:
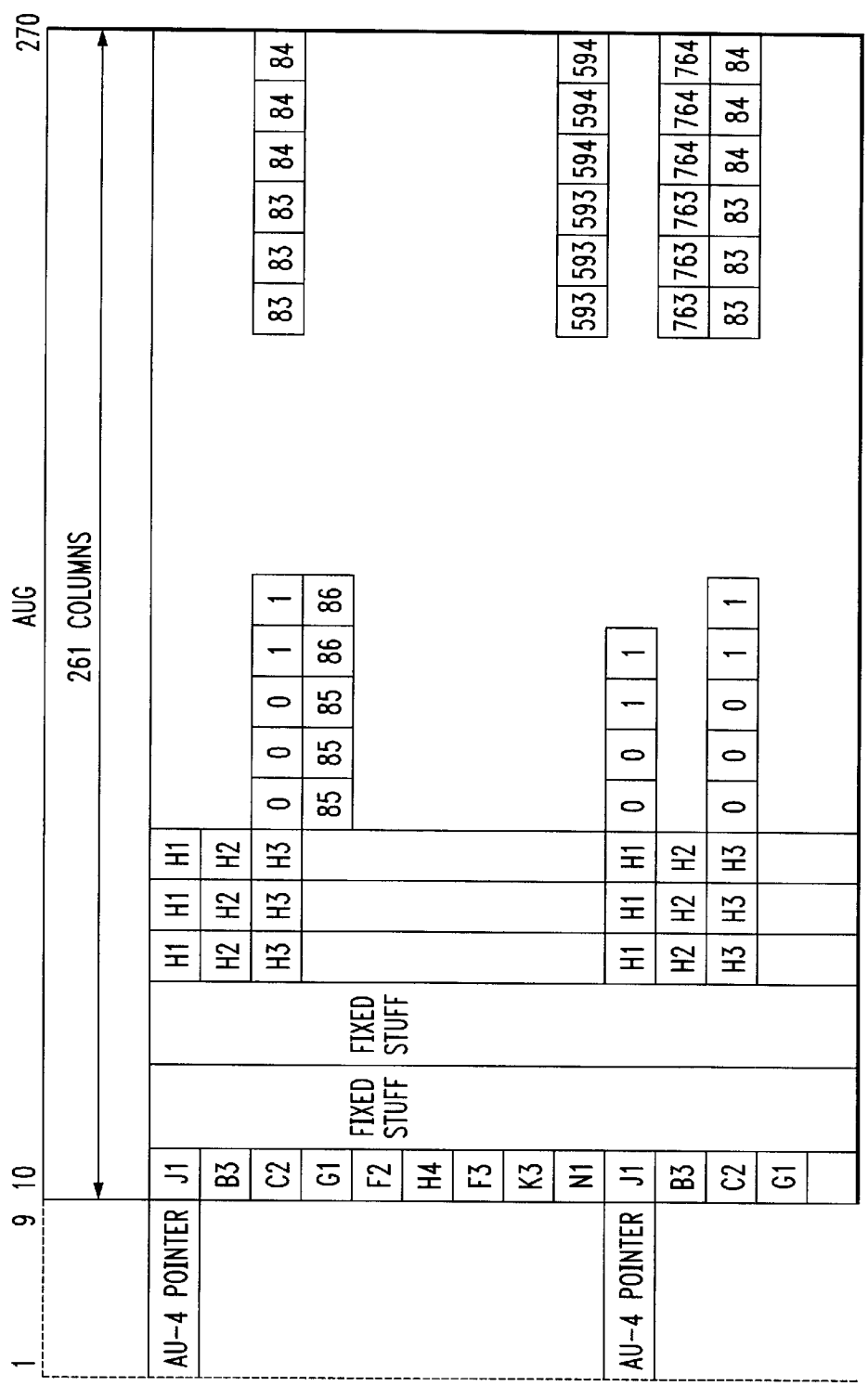
FIG. 8 illustrates the format of the data signals output by the present system for broadband data payload conversion, in the form of AU4/VC4/TU3/VC3 payloads.

FIG. 2 shows a simplified block diagram of one fourth of the conversion circuitry of a SA-1/4 circuit pack. This diagram highlights the functions performed by the VCA in the context of the operations performed by properly-configured SPECTRA and TUPP+ devices. The reference points labeled A through H are used to help describe the conversions that the VCA and surrounding components perform on the signal format as it moves through the SA-1/4. At reference point E, the output is an ITU-Iegal VC-4 signal that carries three TU-3 data streams, as shown in FIG. 8. The VCA FPGA performs a portion of a non-ITU standard conversion between AUG/AU3/VC3 Payloads to AU4/VC4/TU3/VC3 Payloads. It does so in both directions; that is, AUG/AU3/VC3 payloads as shown in FIG. 1 are converted to/from AU4/VC4/TU3/VC3 payloads in a non-conventional way. The traditional conversion between these formats would be both expensive and wasteful.

Data Formats for Conversions

In particular, FIG. 1 illustrates the six possible signal processing paths that can be taken to produce the AU4/VC4/TU3/VC3 payload. The processes take channel data at the rates noted on FIG. 1 adjacent the blocks labeled: C-4, C-3, C-2, C-12, C-11 and produce a resultant data stream of 155 Mbit/second, output into blocks: STM-N, STM-1, STM-0 on FIG. 1.

In the first process, the C-4 data stream is mapped into a VC-4 format and aligned with AU-4 pointers. The resultant multiplexed data stream is packaged into an AUG format. The second process maps the C-3 data stream to a VC-3 format which is then aligned and the TU-3 pointers appended thereto. This resultant data stream is processed by TUG-3 and three data streams are multiplexed together into the VC-4 format and aligned with AU-4 pointers. The resultant multiplexed data stream is packaged into an AUG format. In the third process, the C-3 data stream is mapped to a VC-3 format which is then aligned and the AU-3 pointers appended thereto. Three of these data streams are then multiplexed together and packaged into an AUG format. The fourth process takes a C-2 data stream which is processed to a VC-2 format which is then aligned and the TU-2 pointers appended thereto. This resultant data stream is processed by TUG-2 and either seven data streams are multiplexed together into the VC-3 format and aligned with AU-3 pointers and the resultant multiplexed data stream is packaged into an AUG format, or seven data streams are multiplexed together and the resultant data stream is processed by TUG-3 and three data streams are multiplexed together into the VC-4 format and aligned with AU-4 pointers. The resultant multiplexed data stream is packaged into an AUG format. In the fifth process, a C-12 data stream is processed to a VC-12 format which is then aligned and the TU-12 pointers appended thereto. This resultant data stream is processed by TUG-2 and either seven data streams are multiplexed together into the VC-3 format and aligned with AU-3 pointers and the resultant multiplexed data stream is packaged into an AUG format, or seven data streams are multiplexed together and the resultant data stream is processed by TUG-3 and three data streams are multiplexed together into the VC-4 format and aligned with AU-4 pointers. The resultant multiplexed data stream is packaged into an AUG format. In the sixth process, a C-11 data stream is processed to a VC-11 format which is then aligned and either the TU-11 or TU-12 pointers appended thereto. This resultant data stream is multiplexed by three or four, respectively, and processed by TUG-2 and either seven data streams are multiplexed together into the VC-3 format and aligned with AU-3 pointers and the resultant multiplexed data stream is packaged into an AUG format, or seven data streams are multiplexed together and the resultant data stream is processed by TUG-3 and three data streams are multiplexed together into the VC-4 format and aligned with AU-4 pointers. The resultant multiplexed data stream is packaged into an AUG format. These processes represent the present state of data format conversions that are implemented in custom integrated circuits.

Format Conversion of the AU-3 Signal

Figure 3:
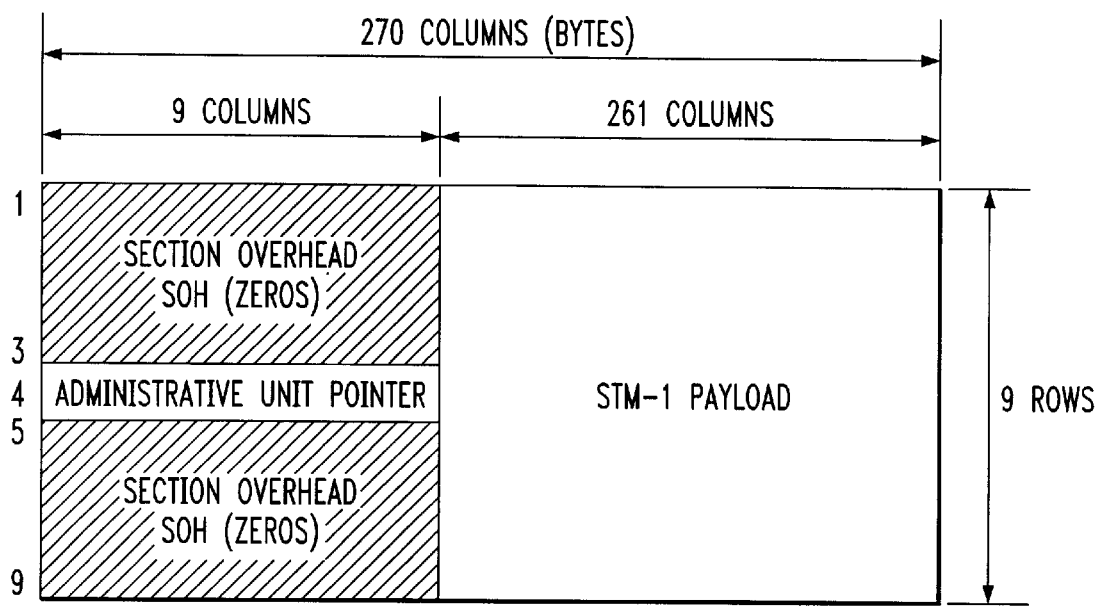
FIG. 3 illustrates the format of the STM-1 payload, consisting of three AU-3 data streams, which payload supports an Administrative Unit Group.
Figure 4:
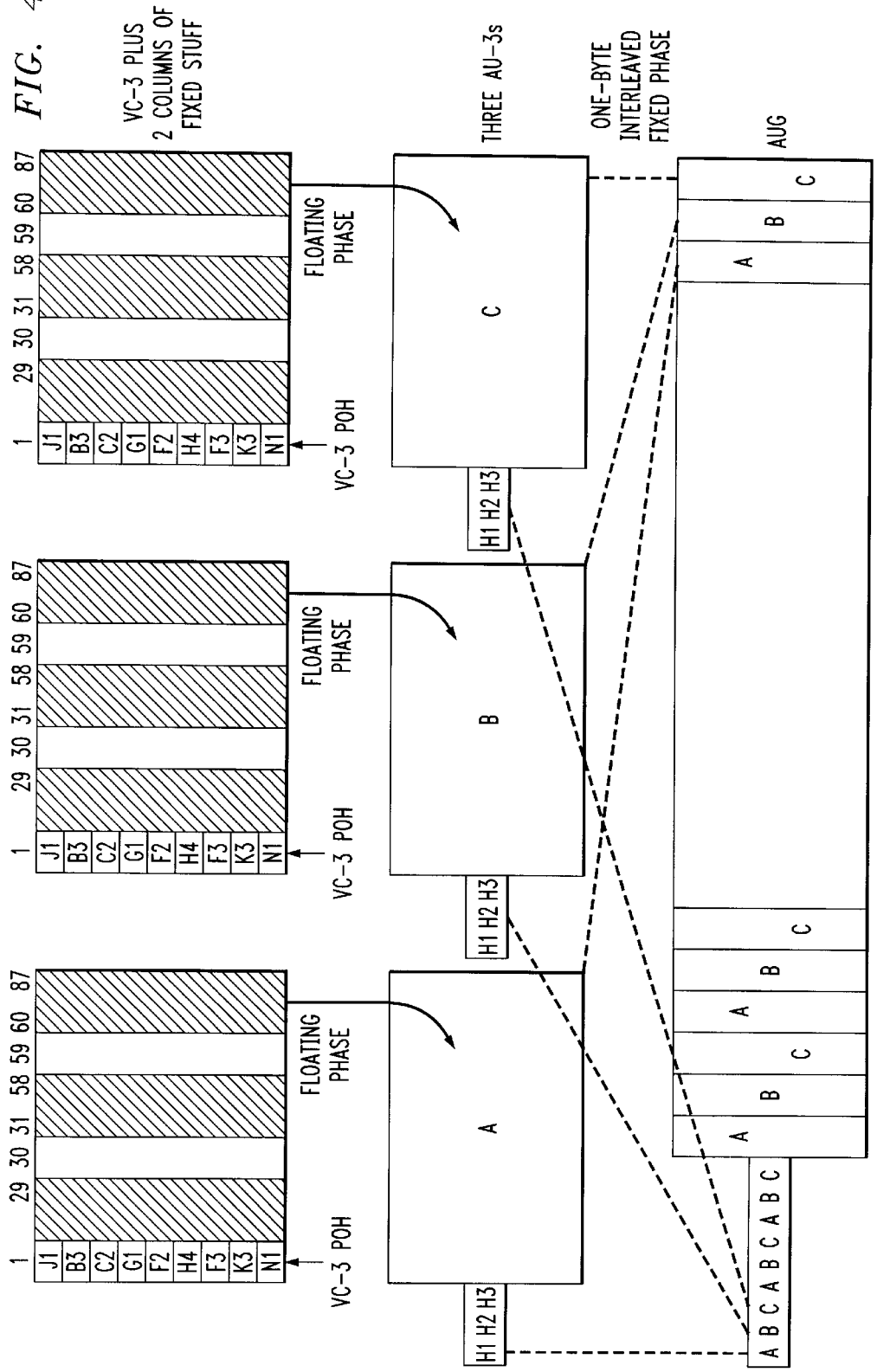
FIG. 4 illustrates the format of an Administrative Unit Group contained in the STM-1 payload.
Figure 9:
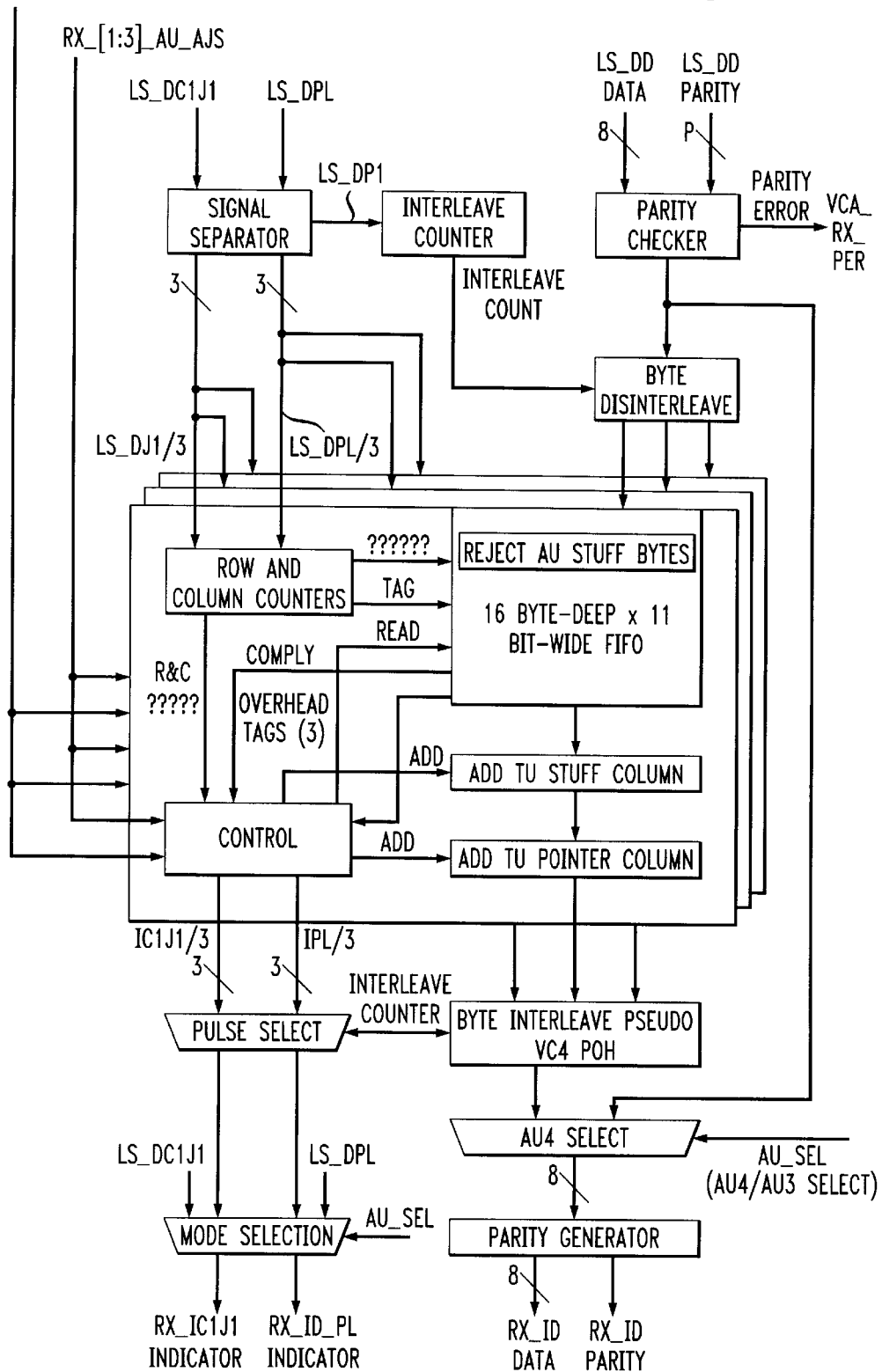
FIG. 9 illustrates in block diagram form additional details of the receive path of the present system for broadband data payload conversion to convert from AUG/AU3/VC3 clear channel payloads to AU4/VC4/TU3/VC3 clear channel payloads.

The standard AU-3 signal format is illustrated in FIG. 3 and comprises an STM-1 payload of data consisting of 261 columns by 9 rows to which is prepended a header of 9 columns by 9 rows of administrative data, where each column comprises a byte of data. In the AU-3 format, the administrative data comprises two section overhead SOH blocks, which are separated by an Administrative Unit Pointer as shown in FIG. 3. This data format is industry standard. The STM-1 payload itself comprises three byte interleaved data streams as shown in FIG. 4. Each data channel comprises 86 columns of data with a set of pointers prepended thereto. Included in the 86 columns of data are two columns of stuff bits. The three data channels have added thereto three bytes of administrative information: H1–H3. The H1, H2 and H3 bytes comprise a preamble or 011010 in the H1 byte followed by a stuff value of 595 (base 10). The H3 byte and the rest of the column are stuffed with zeros. The resulting stuff values in the H1, H2 and H3 bytes are 6A (hex), 53 (hex) and 00 (hex). In operation, at the FIFO output, when the J1 tag is detected, a dummy J1 byte (DJ1, fixed stuffed to zero) is output along with a high pulse marker on the IC1 J1/3 output. Then an H1 byte (fixed stuff to 6A hex) is output, followed by the real J1 byte. The IC1 J1/3 output is set back to low after the DJ1 byte is output. The IPL/3 output bit is set to 1 during all three byte times. When the B3 tag is detected, a dummy B3 byte (DB3 fixed stuffed to 0) is output, then an H2 byte (fixed stuffed to 53 H) is output and then the real B3 byte. When the PO tag is detected, a dummy PO byte (DPO fixed stuffed to 0) is output, then a dummy byte (fixed stuffed to 0) is output (in the first case of PO, this corresponds to H3) and then the real PO byte. Thus, the DPO mechanism covers the last 7 rows of Path Overhead, as represented in FIG. 9 as Add TU stuff column and Add TU Pointer Column. All other VC-3 bytes are output as they are read from their respective FIFOs.

As shown in FIG. 9, Network Data that is received from the line side SPECTRA is in byte format and contains three byte-interleaved data streams, each of which comprises AU3 pointer and payload information. The system byte-disinterleaves the received Network Data into three distinct AU3 data streams. The three distinct AU3 data streams are processed by using write data row counters and write data column counters, one set of counters for each data stream, to identify the stuff columns that are included in the AU3 data. These stuff columns must be removed to enable the conversion of the Network Data into System Data. A FIFO is used to store all of the inbound VC3 bytes while rejecting the stuff bytes that are written into columns 30 and 59 of the AU3 data. The FIFO is 11 bytes wide to allow for storage of the byte wide data as well as the Path Overhead markers. The incoming J1 byte is tagged with a "one" in the J1 marker bit when it is written into the FIFO.

Figure 7:
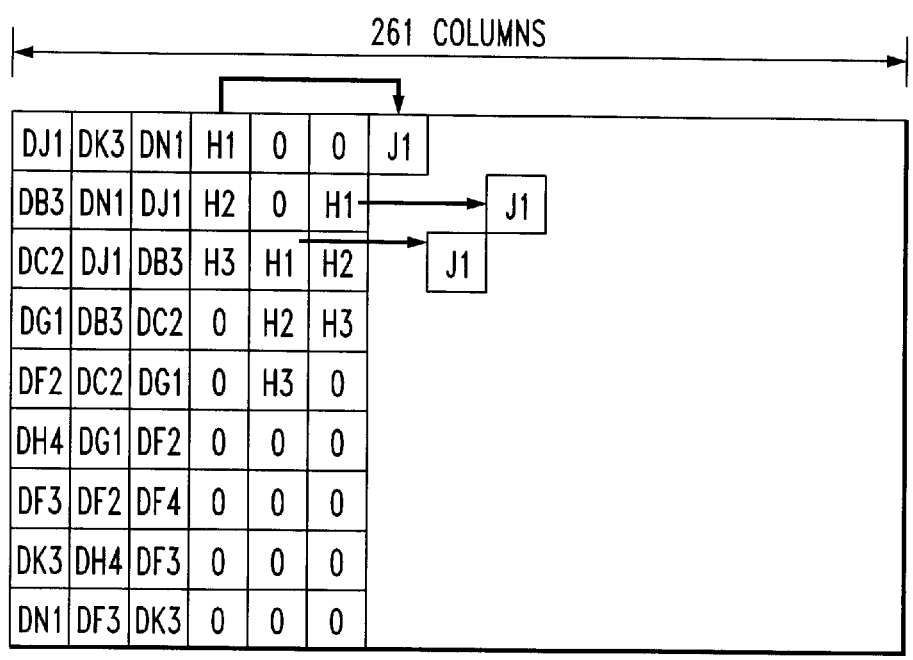
FIG. 7 illustrates the format of a pseudo-VC4/TU3 signal.

The output of the FIFO uses the J1 tag when detected to reconstruct the output data stream in the format illustrated in FIG. 3. The three data streams are byte interleaved as shown in FIG. 7 into a pseudo VC4/TU3 data stream with the TUPP completes the final stages of the data format conversion by adding the VC4 POH and AU4 pointers to create the data format of FIG. 8.

Figure 5:
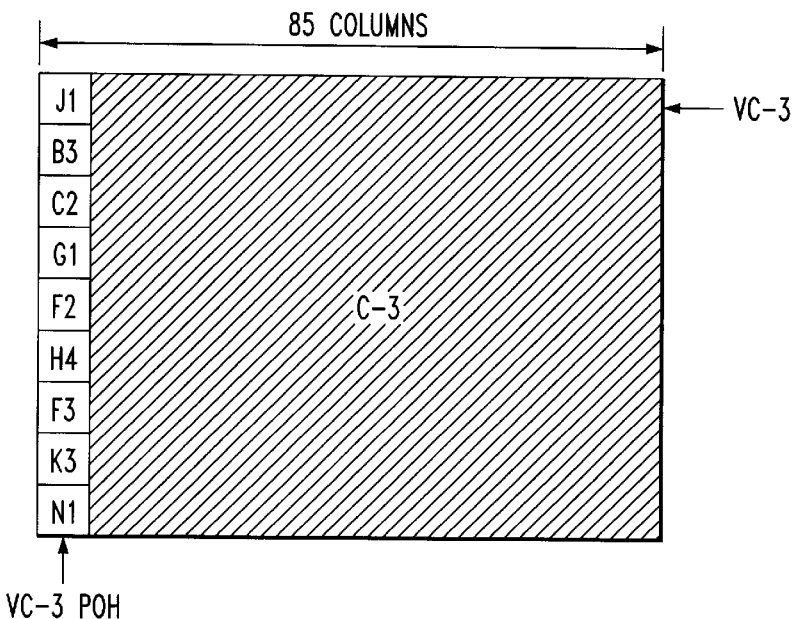
FIG. 5 illustrates the format of a reconstructed VC-3 signal.
Figure 6:
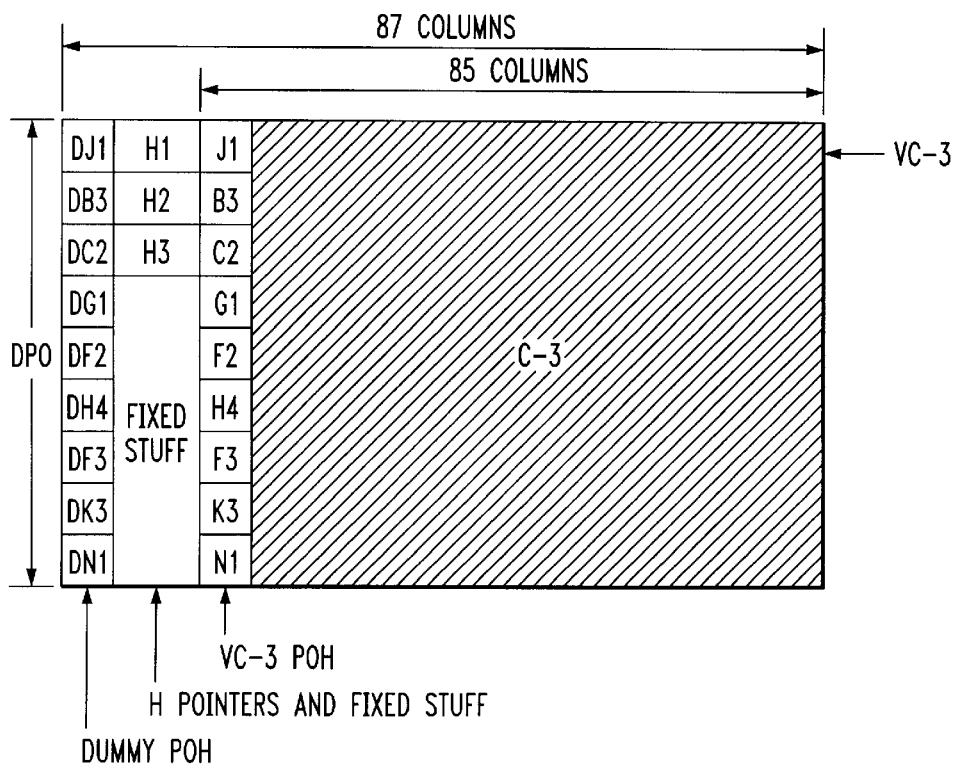
FIG. 6 illustrates the format of the reconstructed VC-3 signal, with the inclusion of TU-3 stuff bytes and pointers.

The resultant data streams are byte interleaved as shown in FIG. 4. It is desired to convert the byte interleaved set of three data streams into a basic TUG-3 format that comprises a 9 row by 86 column data structure. To accomplish this, the present system byte disinterleaves the three data streams back to the AU-3 data streams. The stuff columns are then eliminated and the VC-3 signal as shown in FIG. 5 is obtained at point B. Each VC-3 data stream is then converted to TU-3 format by the addition of a dummy J1 byte column DJ-1 plus an H-pointer column to produce 87 columns as shown in FIG. 6 at point C. At reference point D, the three pseudo TU-3 data streams and their associated dummy J1 bytes and H bytes are byte interleaved together to create a pseudo VC4 signal. The dummy bytes are all zero, so the first three columns carry stuff values of zero. The next three columns illustrate the H pointers and how the three real J1 bytes are pointed to by the fixed 595 (base 10) H pointers.

Receive Direction

At the inter-face going FROM the Line Side SPECTRA TO the VCA, the format can be either STM-1/AU3 or ATM1/AU4. This signal, present at reference point A of FIG. 2, is shown below in FIG. 3. It is an STM-1 payload which supports an Administrative Unit Group (AUG) where the AUG can consist of either one AU-4 or 3 AU-3 s. We are interested in the latter here. The only difference between a standard STM-1 signal and the signal at reference point A is that the SOH is stuffed with zeros by the Line Side SPECTRA.

In what we will call Conversion Mode, the payload of the SPECTRA at reference point A is shown in FIG. 4. Note that each VC-3 is part of an AU-3 which combine to make an AUG. This data is taken into the VCA and byte-disinterleaved and processed into three signals (see FIG. 5) at reference point B. Recall that the purpose of the VCA in this direction is to convert the AU3's into TUG3's where a TUG-3 is a 9-row by 86-column structure. Thus, the VCA has removed the stuff columns by the time the signals get to this intermediate point. At reference point C, the signal has been augmented by a Dummy J1 (DJ1) byte column plus an H-pointer column for a total of 87 columns as shown in FIG. 6. The DJ1 byte (fixed stuff value=0) in a column of fixed stuff bytes (all set to 0) is equivalent to a column of zeros. A second column is added which contains H1, H2, and H3 bytes with a preamble of 011010 (binary) in the H1 byte followed by a stuff value of 595 (base ten). H3 and the rest of the column is fixed stuffed to 0. The resulting stuff values in the H1, H2, and H3 bytes are 6A (hex), 53 (hex) and 00 (hex). This is shown below.

At reference point D (see FIG. 7), VCA conversion has the effect of byte interleaving the three pseudo TU3's and their associated Dummy J1's and H bytes into a pseudo VC4 signal. Recall that all the dummy bytes are set to a value of zero. Another way of saying this is that the first 3 columns are effectively carrying stuff values of zero. The next three columns illustrate how the H pointers may appear and how the three REAL J1 bytes are pointed to by the fixed 595 (base 10) H pointers would appear in this illustrative example.

At reference point E, the output of the Receive-side TUPP+, is an ITU-legal VC4 signal carrying three TU3's. Adding the locked pointer 0, the output of the Receive-side TUPP+looks like FIG. 8.

Description of the AU3 to AU4/TU3 Conversion Process

1. Data coming from the Line Side Spectra is in Byte Telecombus Mode and contains byte-interleaved AU3 pointer and payload information. Parity is first checked and then the data is byte-disinterleaved into three AU3 data path streams.

2. Write-data row and column counters (one for each path) are used to identify stuff columns and other data of interest. The respective J1 pulse, extracted from the LS-DC1 J1 pulse coming from the Line Side Spectra is used to reset the respective data path's write counters.(Note: the row and column counters refer to the top figures within FIG. 4. These counters count from 1 to 87 (columns) and 1 to 9 (rows) only when LS_DPL is high and are initialized by the JI event extracted from LS-DC1J1.

3. A FIFO (using the XILINX built-in CLB 16-byte deep RAM capability per XILINX Application notes OSI, 044, and 053) is used to store ALL inbound VC3 bytes while rejecting stuff bytes in columns 30 and 59. The FIFO is 11 bits wide to allow for storage of the byte-wide data PLUS 1-bit J1, B3, and PO (remaining Path Overhead) markers.

4. The incoming J1 byte is "tagged" with a "one" in the J1 marker bit described above when it is written into the FIFO.

5. At the FIFO output, when the J1 tag is detected, a dummy J1 byte (DJ1, fixed stuffed to 0) is output along with a high pulse marker on the IC1 J1/3 output. Then, an H1 byte (fixed stuff to 6A hex) is output, followed by the real J1 byte. The 1C1J1/3 output is set back to low after the DJ1 byte is output. The IPL/3 output bit is set to 1 during all 3 byte times. (Note: IC1J1/3 and IPL/3 refers to the signals that EACH path mixes into the RX_IC1|1 and RX_ID_PL outputs of the VCA). When the B3 tag is detected, a dummy B3 byte (DB3, fixed stuffed to 0) is output, then an H2 byte (fixed stuffed to 53 H) is output, and then the real B3 byte. When the PO tag is detected, a dummy PO byte (DPO, fixed stuffed to 0) is output, then a dummy byte (fixed stuffed to 0) is output (in the FIRST case of PO, this corresponds to H3), and then the real PO byte. Thus, The DPO mechanism covers the last 7 rows-worth of Path Overhead. (This is represented symbolically in FIG. 9 by the "Add TU Stuff Column" and "Add TU Pointer Column"). All other VC3 bytes are output as they are read from their respective FIFOs.

6. When the FIFO is empty, the IPL/3 node is reset to 0. If the FIFO is for TU3#1, the IC1J1/3 node is set to 1. Otherwise, 1C1J1/3 is set to 0. This implies that the F1 portion of RX_IC1J1 will pulse many times during a frame. (This has been verified by PMC-Sierra to be acceptable operation).

7. The data from the three paths is byte-interleaved as shown in FIG. 7 and passed on to the Receive side TUPP+ via the RX_ID bus, RX_IC1J1, and RX_ID_PL. RX-ICIJ1 pulses HIGH during RX_ID_PL HIGH to mark the J1 byte on the RX_ID bus for each TU3. RX_IC1J1 pulses HIGH during, RX_ID_PL LOW to inform the Receive-side TUPP+ which TU3 is TU3 number one (of three) within the Pseudo-VC4 coming from the VCA. The System Side Spectra expects a true STM1/AU4/TU3 (except the MSOH, RSOH and POH do not have to be valid). It is the TUPP+ that performs this conversion, adding dummy VC4 POH and AU4 pointers. Thus, the System Side Spectra receives an STM1/AU4/TU3 as shown in FIG. 8.

Transmit Direction

Figure 10:
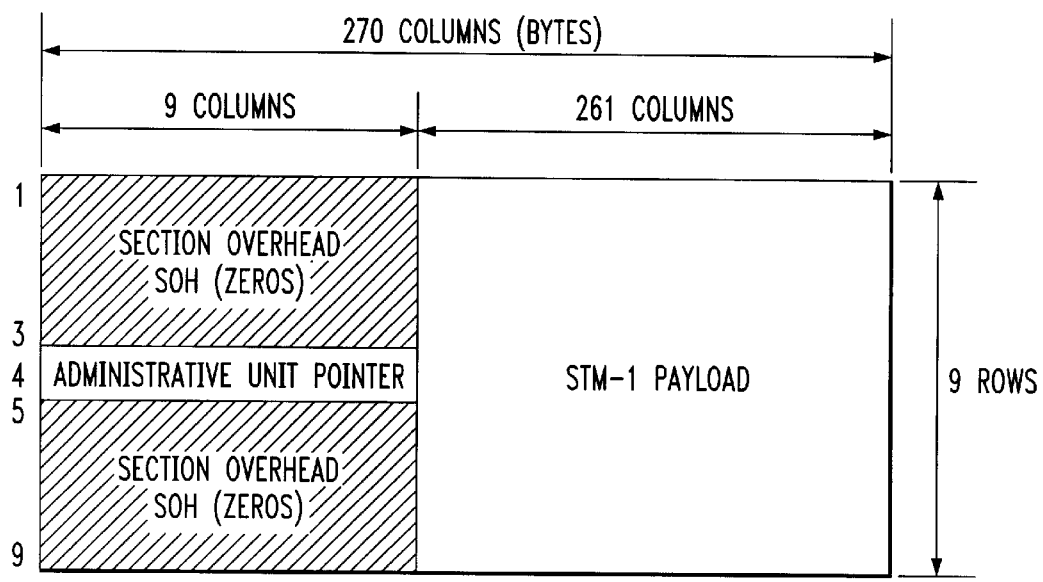
FIGS. 10 and 11 illustrate the format of a VC4 data frame that carries thee TUG-3 data streams.
Figure 11:
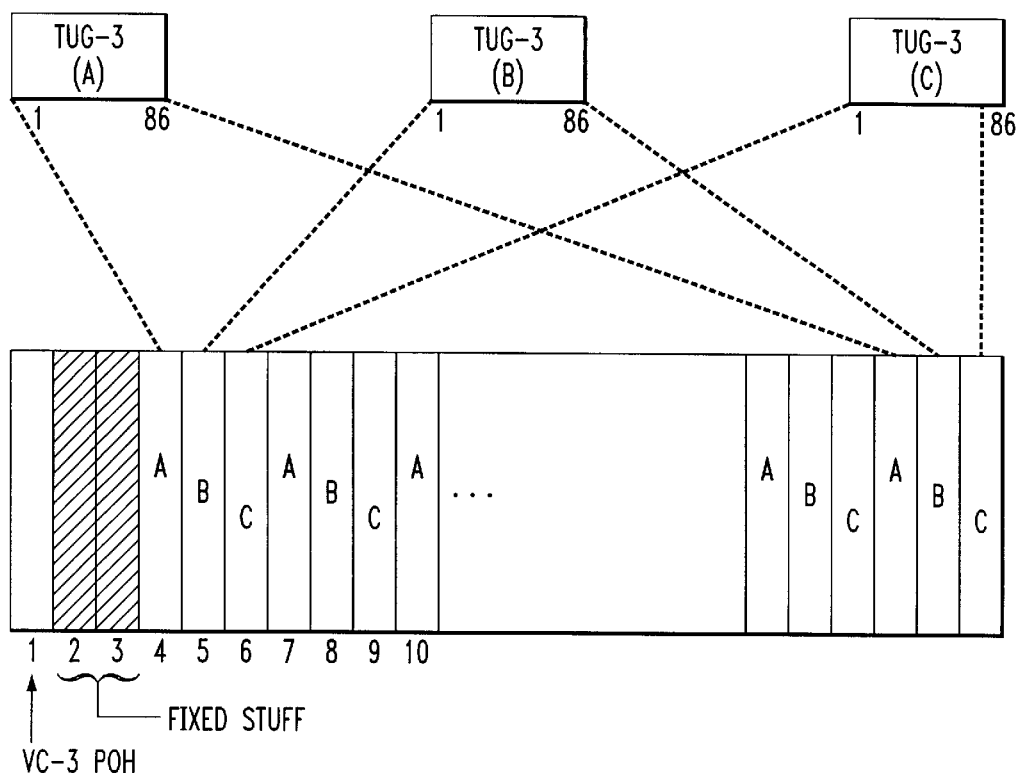
Figure 11:
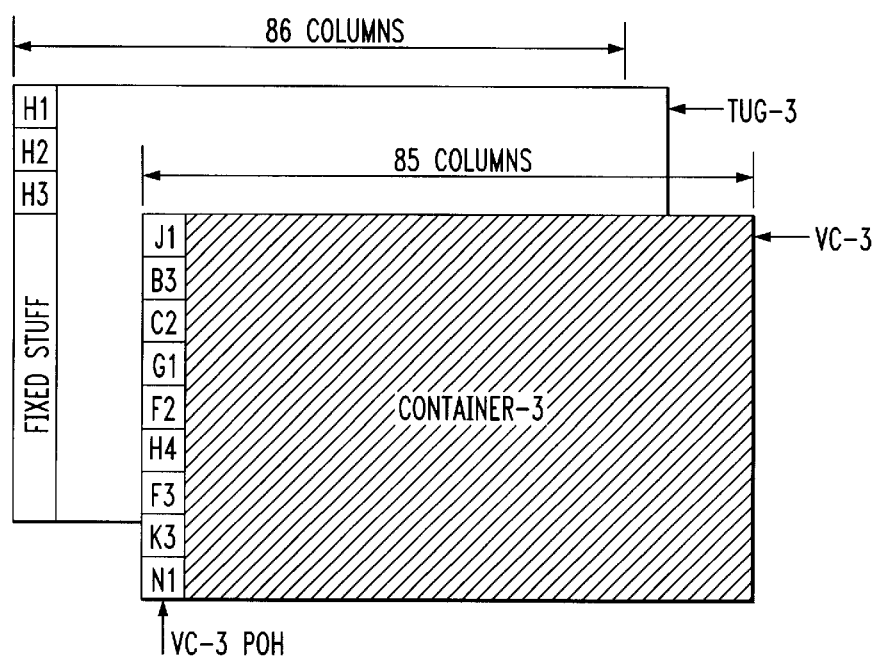

At the interface going FROM the System Side SPECTRA TOWARDS the VCA, the signal looks like a standard STM-1 signal with the SOH is stuffed with zeros by the System Side SPECTRA. FIGS. 10 and 11 show how reference point F appears. After being processed by the Transmit TUPP+, the signal at reference point G still appears as given in FIGS. 10 and 11 except the signal is accompanied by markers for the J1, C1, and Payload. Thus, the job of the Transmit TUPP+ is to perform TU3 pointer interpretation.

The arrangement of three TUG-3 s multiplexed into the VC-4 is shown in FIG. 4. The TUG-3 is a 9-row by 86-column structure, The VC-4 consists of one column of VC-4 POH, two columns of fixed stuff and a 258-column payload structure. The three TUG-3 s are single-byte interleaved into the 9-row by 258-column VC-4 payload structure and have a fixed phase with respect to the VC-4. The payload at reference point H appears as given in FIG. 12.

Description of the AU4/TU3 to AU3 Conversion Process

1. Data coming from the Transmit TUPP+ is in Byte Telecombus Mode and contains byte-interleaved AU4/TU3 pointer and payload information. Parity is first checked and then the data is byte-disinterleaved into three TU3/VC3 data path streams and sent on to a FIFO (one for each data stream).

2. A FIFO (using the XILINX built-in CLB 16-byte deep RAM capability per XILINX Application notes OSI, 044, and 053) is used to store ALL inbound TU3/VC3 bytes as indicated by TX_OTPL when set to 1. The FIFO is 9 bits wide to allow for storage of the byte-wide data PLUS a 1-bit J1 pulse, indicated by the TX_OTV5 pulse coming from the Transmit TUPP+ and associated with the respective TU3/VC3 data path. This incoming J1 byte (labeled by TX_OTV5) is "tagged" as a "one" in the J1 marker bit described above when it is written into the FIFO.

3. Read-data column counters (one for each path) keep track of outgoing columns and are used to identify AU3 fixed stuff bytes and other data of interest.

4. The respective J1 bit is used to reset the associated data path's read counter when it is read out of the FIFO. The column counter also wraps around at the end of each row. This occurs at a count value of 85 (the count freezes during the 2 stuff columns).

5. When the column count is either 30 or 59, the FIFO read is suppressed once and a stuff byte of all zeros is output and the respective LS_APL/3 node is forced to logic 1. All other TU3/VC3 bytes are output as they are read from their respective FIFOs. At this point, we can call the resulting data stream a pseudo AU3/VC3.

6. When the FIFO is empty, the respective LS_APL/3 node is reset to 0 and the column counter is not incremented. The respective LS-APL/3 node is set to 1 otherwise.

7. If the empty FI FO is associated with AU3#1, the LS_AC1J1/3 node is set to 1. For the other 2 AU3 s, LS_AC1J1/3 is set to 0 for this condition.

8. Each LS_AC1J1/3 node is also set to 1 when the FIFO is NOT empty but a JI byte is being read from the respective FIFO.

Figure 12:
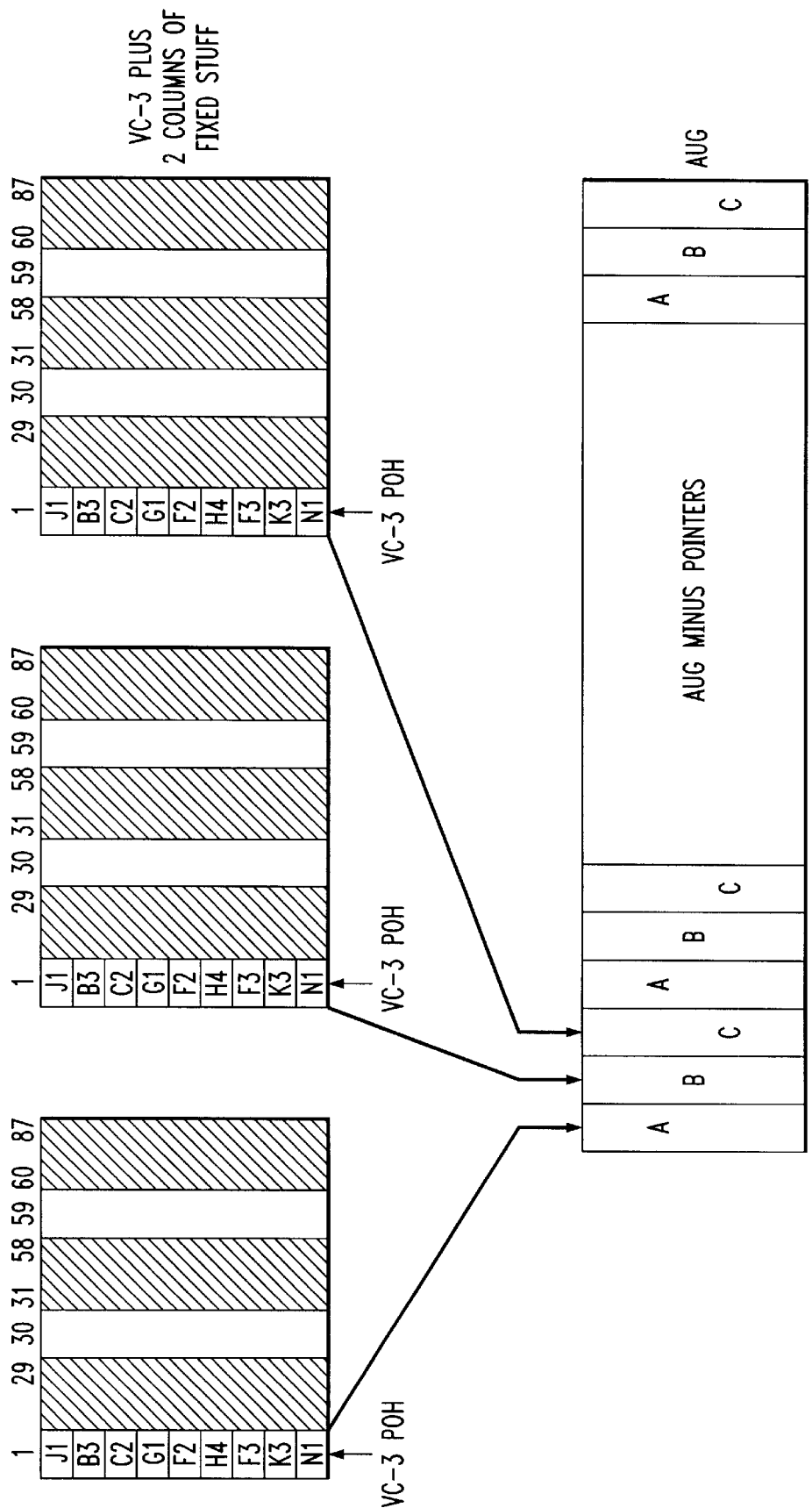
FIG. 12 illustrates the format of the AUG/AU3/VC3 signal without pointers.
Figure 13:
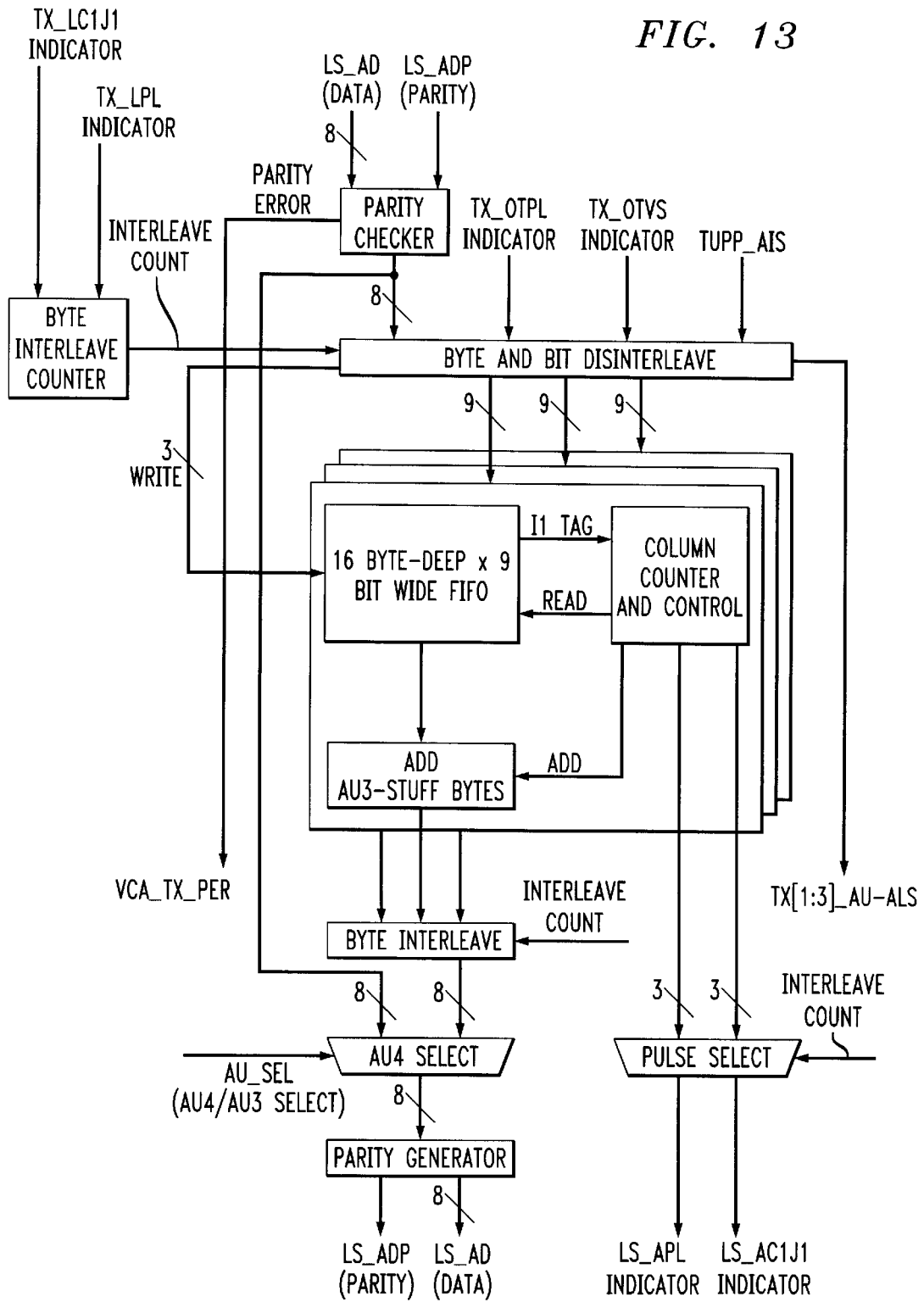
FIG. 13 illustrates in block diagram form additional details of the transmit path of the present system for broadband data payload conversion to convert from AU4/VC4/TU3/VC3 clear channel payloads to AUG/AU3/VC3 clear channel payloads.

9. The data from the three paths are byte-interleaved as shown in FIG. 12 and passed on to the Lineside Spectra via the LS_AD bus. Steps 6, 7, and 8 imply that LS_AC1J1 will pulse to indicate CI multiple times per frame. This CI pulse informs the Line Side Spectra which AU3 is AU3 number one (of three) whenever LS_AC1J1 pulses HIGH when LS_APL is LOW. When LS_AC1J1 pulses HIGH when LS_APL is HIGH, it delineates a VC3 J1 POH byte on the LS_AD bus.

10. This data is fed into the Line Side Spectra as a AUG/AU3/VC3 data with the pointer bytes removed as shown in FIG. 12. The TPIP block in the Line Side Spectra must be disabled by software due to the peculiar operation that this algorithm requires.

SUMMARY

The system for broadband data payload conversion efficiently converts broadband data between two sets of data formats by manipulating the format conversion to simplify the format conversion process. In particular, this software system converts between AUG/AU3/VC3 clear channel payloads and AU4/VC4/TU3/VC3 clear channel payloads in an efficient manner, which also complies with the industry standard data formatting requirements. The present system implements an efficient data format conversion process that uses existing circuitry and can effect the data format conversion with only a few bytes of delay instead of an entire frame of delay as is typically found in existing systems.

What is claimed:

1. A data format conversion system for converting received network data between AUG/AU3/VC3 clear channel payloads and AU4/VC4/TU3/VC3 clear channel payloads, comprising:

means for byte-disinterleaving said received network data into a plurality of distinct AU3 data streams;

means for processing each of said plurality of distinct AU3 data streams using write data row counters and write data column counters, one set of counters for each of said data streams, to identify the stuff columns that are included in each of said plurality of distinct AU3 data streams;

means for deleting said stuff columns in each of said plurality of distinct AU3 data streams;

means for converting each VC-3 data stream to a pseudo VC-4/TU-3 format data stream by the addition of a dummy J1 byte column, DJ-1, plus an H-pointer column having H1, H2, and H3 bytes for each VC-3 data stream and interleaving three VC-3 data streams into a VC-4/TU-3 format, wherein H1 in said H-pointer column for each VC-3 data stream has a fixed value and is located from its corresponding J1 byte column in said VC-4/TU-3 format by a number of bits set by said fixed value; and means for discarding dummy bytes, interpreting said H1 and H2 pointers in said pointer columns in said pseudo VC-4/TU-3 format, generating new H1, H2, and H3 values and new values in said dummy J1 column and maintaining said payload intact to form a valid AU4/VC4/TU3/VC3 payload.

2. The data format conversion system of claim 1, wherein said means for deleting said stuff columns further comprises:

it means for tagging the incoming J1 byte with a "one" in the J1 marker bit when it is written into said FIFO means.

3. The data format conversion system of claim 1, wherein the stuff bits deleted are those in columns 30 and 59 of the AU3 data.

4. A method of operating a data format conversion system for converting received network data between AUG/AU3/VC3 clear channel payloads and AU4/VC4/TU3/VC3 clear channel payloads, comprising:

byte-disinterleaving said received network data into a plurality of distinct AU3 data streams;

processing each of said plurality of distinct AU3 data streams using write.data row counters and write data column counters, one set of counters for each data stream, to identify the stuff columns that are included in each of said plurality of distinct AU3 data streams;

deleting said stuff columns that are included in each of said plurality of distinct AU3 data streams in columns 30 and 59 of the AU3 data to create VC-3 data streams;

converting each of said VC-3 data streams to a pseudo AU-4/TU-3 format data stream by the addition of a dummy J1 byte column, DJ-1, plus an H-pointer column having H1, H2, and H3 bytes for each VC-3 data stream and interleaving the three VC-3 data streams into a VC-4/TU-3 format; and wherein H1 in said H column of each VC-3 data streams has a fixed value and is located from its corresponding J1 byte column in said VC-4/TU-3 format by a number of bits set by said fixed value; and discarding dummy bytes, interpreting H1, H2 and H3 values in said pointer columns, generating new values in a J1 column of a VC-4 formed from said pseudo VC-4 and maintaining said VC-3 payload intact to form a valid AU4/VC4/TU3/VC3 payload.

5. The method of operating a data format conversion system of claim 4, wherein said step of deleting said stuff columns further comprises:

tagging the incoming J1 byte with a "one" in the J1 marker bit when it is written into said FIFO.

6. The data format conversion system of claim 1, including means for reconstructing an output data stream in a pseudo VC4/TU3 format upon detection of a J1 byte tag.

* * * * *

UNITED STATES PATENT AND TRADEMARK OFFICE
CERTIFICATE OF CORRECTION

PATENT NO. : 6,603,776 B1
DATED : August 5, 2003
INVENTOR(S) : Fedders et al.

It is certified that error appears in the above-identified patent and that said Letters Patent is hereby corrected as shown below:

Column 3,
Line 8, delete "MI 6/1", and insert -- M16/1 --.
Line 31, delete "ITU-Iegal", and insert -- ITU-legal --.

Column 4,
Lines 59-60, delete "53 H", and insert -- 53H --.

Column 6,
Line 58, delete "53 H", and insert -- 53H --.

Column 8,
Line 10, delete "FI FO", and insert -- FIFO --.

Column 9,
Line 12, delete "it".
Line 26, delete ".".

Signed and Sealed this

Twenty-first Day of October, 2003

JAMES E. ROGAN
*Director of the United States Patent and Trademark Office*